(12) United States Patent
Karuturi et al.

(10) Patent No.: US 11,188,195 B2
(45) Date of Patent: Nov. 30, 2021

(54) METHOD FOR PLAYING MUSIC IN VEHICLE AUDIO SYSTEM AND VEHICLE AUDIO SYSTEM TO WHICH THE METHOD IS APPLIED

(71) Applicants: HYUNDAI MOTOR COMPANY, Seoul (KR); KIA MOTORS CORPORATION, Seoul (KR)

(72) Inventors: Venkata Avinash Karuturi, Hyderabad (IN); Raja Kullayappa Chintalapalli, Andhra Pradesh (IN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 326 days.

(21) Appl. No.: 16/368,061

(22) Filed: Mar. 28, 2019

(65) Prior Publication Data
US 2020/0198547 A1    Jun. 25, 2020

(30) Foreign Application Priority Data

Dec. 24, 2018    (IN) .............................. 201811048863

(51) Int. Cl.
*G06F 3/16* (2006.01)
*G06F 16/68* (2019.01)
(Continued)

(52) U.S. Cl.
CPC ............ *G06F 3/0482* (2013.01); *G06F 3/048* (2013.01); *G06F 3/04842* (2013.01); *G06F 3/167* (2013.01); *G06F 16/686* (2019.01)

(58) Field of Classification Search
CPC .... G06F 3/0482; G06F 3/04842; G06F 3/048; G06F 3/167; G06F 16/686; G06F 3/165;
(Continued)

(56) References Cited

U.S. PATENT DOCUMENTS

| | | | |
|---|---|---|---|
| 2010/0122217 A1* | 5/2010 | Yen | G06F 16/44 715/846 |
| 2014/0289196 A1* | 9/2014 | Chan | G06F 16/178 707/626 |

(Continued)

FOREIGN PATENT DOCUMENTS

JP    2016-212936 A    12/2016

OTHER PUBLICATIONS

Fidicen, MP3 frequency comparison, published Nov. 2008, pp. 1-2). (Year: 2008).*

*Primary Examiner* — Tan H Tran
(74) *Attorney, Agent, or Firm* — Mintz Levin Cohn Ferris Glovsky and Popeo, P.C.; Peter F. Coriess (57) ABSTRACT

A method for playing music in a vehicle audio system includes: playing, by a controller, a music file of a user device that is received via communication; determining, by the controller, whether metadata of the music file to be played matches metadata of a music file that is stored in a first storage device and has sound quality that is better than sound quality of the music file of the user device; and stopping, by the controller, playback of the music file of the user device and playing the music file of the first storage device when the metadata of the music file to be played matches the metadata of the music file of the first storage device.

13 Claims, 5 Drawing Sheets

(51) Int. Cl.
*B60R 11/02* (2006.01)
*G06F 3/0482* (2013.01)
*G06F 3/0484* (2013.01)
*G06F 3/048* (2013.01)

(58) Field of Classification Search
CPC ............ G11B 19/025; G11B 20/10527; G11B 2020/10546; G11B 2220/2537; G11B 2220/61; G11B 27/28; B60R 11/0211
See application file for complete search history.

(56) References Cited

U.S. PATENT DOCUMENTS

2018/0307458 A1* 10/2018 Daman ................... A63F 13/25
2019/0042647 A1* 2/2019 Oh ........................ G06F 16/636

* cited by examiner

| Media Format | Bitrate (kbps) | Cut-off(kHz) |
|---|---|---|
| MP3 | 64 | 11 |
| MP3 | 128 | 16 |
| MP3 | 192 | 19 |
| MP3 | 320 | 20 |
| M4A | 500 | 22 |
| FLAC | >1000 | No Cut-off |

FIG. 5

METHOD FOR PLAYING MUSIC IN VEHICLE AUDIO SYSTEM AND VEHICLE AUDIO SYSTEM TO WHICH THE METHOD IS APPLIED

BACKGROUND

(a) Field

The present disclosure relates to an audio system for a vehicle, and more particularly, to a method for playing music in a vehicle audio system and the vehicle audio system to which the method is applied.

(b) Description of the Related Art

Drivers become more tense when driving under bad weather conditions like snow, rain, fog, etc. than under good weather conditions. In traffic-jammed areas, the drivers may have to repeatedly accelerate and decelerate, which makes them feel more tense than when driving at a normal speed. Moreover, the drivers will get more and more tired over time, and this will increase the stress level of drivers. Also, the drivers will become stressed when they repeatedly make sudden stops to handle their driving style or to cope with risky situations.

As stated above, the drivers get quite stressed while driving, depending on the driving environment. High levels of stress for the drivers may not only increase their tiredness, but also increases the risk of accidents. The drivers need to properly relieve their stress while driving.

One of the most common things that helps relieve a driver's stress while driving is an audio device. While driving, the driver can relieve stress from driving by listening to the radio or music saved on a storage medium through an audio device. The driver can relieve stress more easily by listening to music that can help deal with their nerves, i.e., the stress the driver is feeling.

Meanwhile, the demand for technologies for finding, classifying, and suggesting information is growing along with the rapid increase in data volumes. Particularly, a technology for finding desired music and suggesting music that might be liked is necessary for more than several thousand or ten thousand music track files.

Genre information and artist information may be available for finding music and getting music recommendations. Genres are descriptors most commonly used to classify pieces of music by form or style. The artist information allows one to find artists and get artist recommendations by classification of artists according to their similarities in musical style.

The above information disclosed in this Background section is only for enhancement of understanding of the background of the invention, and therefore it may contain information that does not form the prior art that is already known in this country to a person of ordinary skill in the art.

SUMMARY

One aspect of the present invention provides a method for playing music in a vehicle audio system and the vehicle audio system to which the method is applied which are capable of automatically changing or converting a music source of a music file using metadata and sound quality of the music file to play music of high sound quality.

An embodiment of the present invention may provide the method for playing music in the vehicle audio system, including: playing, by a controller, a music file of a user device that is received via communication; determining, by the controller, whether metadata of the music file to be played matches metadata of a music file that is stored in a first storage device and has sound quality that is better than sound quality of the music file of the user device; and stopping, by the controller, playback of the music file of the user device and playing the music file of the first storage device when the metadata of the music file to be played matches the metadata of the music file of the first storage device.

The controller may detect the sound quality of the music file of the user device using a cutoff frequency of the music file of the user device and may detect the sound quality of the music file of the first storage device using a cutoff frequency of the music file of the first storage device.

The first storage device may include a compact disc.

The controller may control a display device to display that the vehicle audio system operates in a mode where the music file of the user device is played when the music file of the first storage device is played.

The method for playing music in the vehicle audio system may further include: determining, by the controller, whether the metadata of the music file to be played matches metadata of a music file that is stored in a second storage device and has sound quality that is better than the sound quality of the music file of the user device and lower than the sound quality of the music file of the first storage device when the metadata of the music file to be played does not match the metadata of the music file of the first storage device; and playing, by the controller, the music file of the second storage device corresponding to the music file of the user device when the metadata of the music file to be played matches the metadata of the music file of the second storage device.

The second storage device may include a universal serial bus memory device.

The controller may control a display device to display that the vehicle audio system operates in a mode where the music file of the user device is played when the music file of the second storage device is played.

Another embodiment of the present invention may provide the method for playing music in the vehicle audio system, including: playing, by a controller, a music file of a first storage device; determining, by the controller, whether metadata of the music file to be played matches metadata of a music file that is stored in a second storage device and has sound quality that is better than sound quality of the music file of the first storage device; and playing, by the controller 505, the music file of the second storage device corresponding to the music file of the first storage device when the metadata of the music file to be played matches the metadata of the music file of the second storage device.

The controller may detect the sound quality of the music file of the first storage device using a cutoff frequency of the music file of the first storage device and may detect the sound quality of the music file of the second storage device using a cutoff frequency of the music file of the second storage device.

The first storage device may include a universal serial bus memory device and the second storage device may include a compact disc.

Another embodiment of the present invention may provide the method for playing music in the vehicle audio system, including: playing, by a controller, a music file of a user device that is received via communication; determining, by the controller, whether metadata of the music file to be played matches metadata of a music file that is stored in a storage device and has sound quality that is better than sound quality of the music file of the user device; and playing, by the controller, the music file of the storage device corresponding to the music file of the user device when the metadata of the music file to be played matches the metadata of the music file of the storage device.

The controller may detect the sound quality of the music file of the user device using a cutoff frequency of the music file of the user device and may detect the sound quality of the music file of the storage device using a cutoff frequency of the music file of the storage device.

The storage device may include a universal serial bus memory device.

An embodiment of the present invention may provide the vehicle audio system, including: a playback device configured to play a music file of a user device received through communication; and a controller configured to control an operation of the playback device and to determine whether metadata of the music file to be played matches metadata of a music file that is stored in a first storage device and has sound quality that is better than sound quality of the music file of the user device. The controller may be configured to stop the playback device from playing the music file of the user device and may be configured to control the playback device to play the music file of the first storage device when the metadata of the music file to be played matches the metadata of the music file of the first storage device.

The controller may be configured to detect the sound quality of the music file of the user device using a cutoff frequency of the music file of the user device and may be configured to detect the sound quality of the music file of the first storage device using a cutoff frequency of the music file of the first storage device.

The first storage device may include a compact disc.

the controller may be configured to determines whether the metadata of the music file to be played matches metadata of a music file that is stored in a second storage device and has sound quality that is better than the sound quality of the music file of the user device and lower than the sound quality of the music file of the first storage device when the metadata of the music file to be played does not match the metadata of the music file of the first storage device, and the controller may be configured to control the playback device to play the music file of the second storage device corresponding to the music file of the user device when the metadata of the music file to be played matches the metadata of the music file of the second storage device.

The second storage device may include a universal serial bus memory device.

A further aspect of the invention provides a method for playing music in a vehicle audio system, comprising: receiving, by a controller, a user input for playing a music file of a user device that is received via communication between the user device and the vehicle audio system; determining, by the controller, whether metadata of the music file to be played matches metadata of a music file that is stored in a first storage device connected to the vehicle audio system and has sound quality that is better than sound quality of the music file of the user device; and stopping, by the controller, playback of the music file of the user device and playing the music file of the first storage device corresponding to the music file of the user device when determined that the metadata of the music file to be played matches the metadata of the music file of the first storage device.

The method for playing music in the vehicle audio system and the vehicle audio system according to the embodiment of the present invention may provide a user of the system with a good sound quality of the music file without additional hardware cost.

BRIEF DESCRIPTION OF THE DRAWINGS

A brief description of the drawings will be provided to more sufficiently understand the drawings which are used in the detailed description of embodiments of the present invention.

DETAILED DESCRIPTION OF EMBODIMENTS

In order to sufficiently understand the present invention and the object achieved by embodying the present invention, the accompanying drawings illustrating embodiments of the present invention and contents described in the accompanying drawings are to be referenced.

Hereinafter, embodiments of the present invention will be described in detail with reference to the accompanying drawings. In describing the present invention, well-known configurations or functions will not be described in detail since they may unnecessarily obscure the gist of the present invention. Throughout the accompanying drawings, the same reference numerals will be used to denote the same components.

Terms used in the present specification are only used in order to describe embodiments rather than limiting the present invention. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

Typically, when a music file is selected by a user in a universal serial bus (USB) mode or a Bluetooth mode of an audio system of a vehicle, the music file may be played in each mode regardless of sound quality of the music file. Further, when a user selects a music file of a USB memory that is stored in the USB memory and on a compact disc (CD), the audio system of the vehicle may play only the music file of the USB memory having a sound quality lower than that of the CD.

Figure 1:
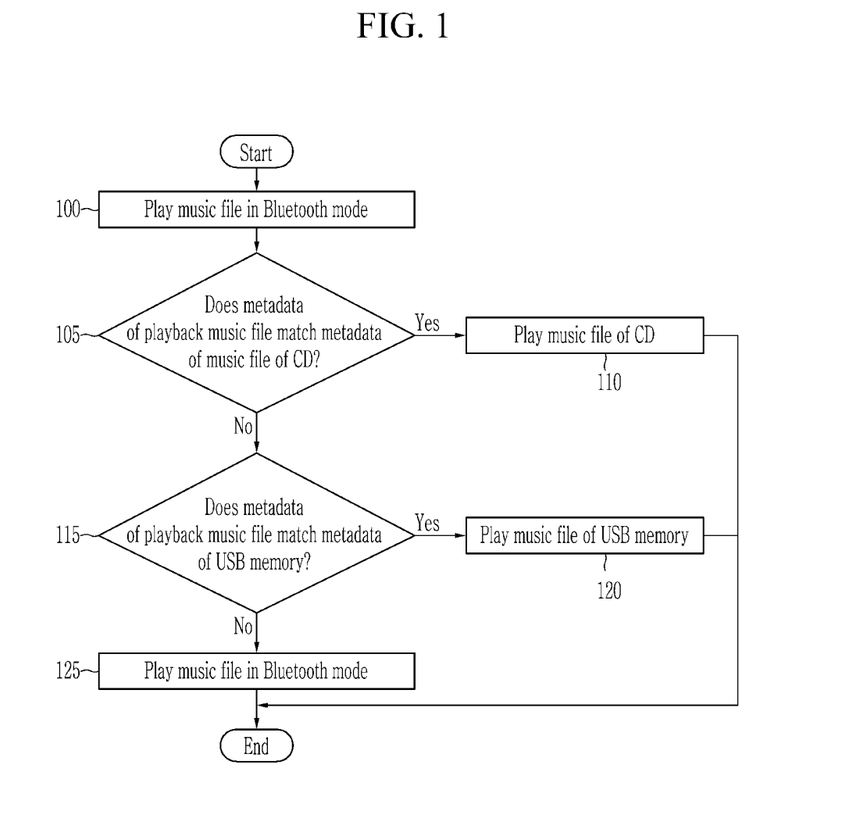
FIG. 1 is a flowchart illustrating a method for playing music in a vehicle audio system according to an embodiment of the present invention.
Figure 2:
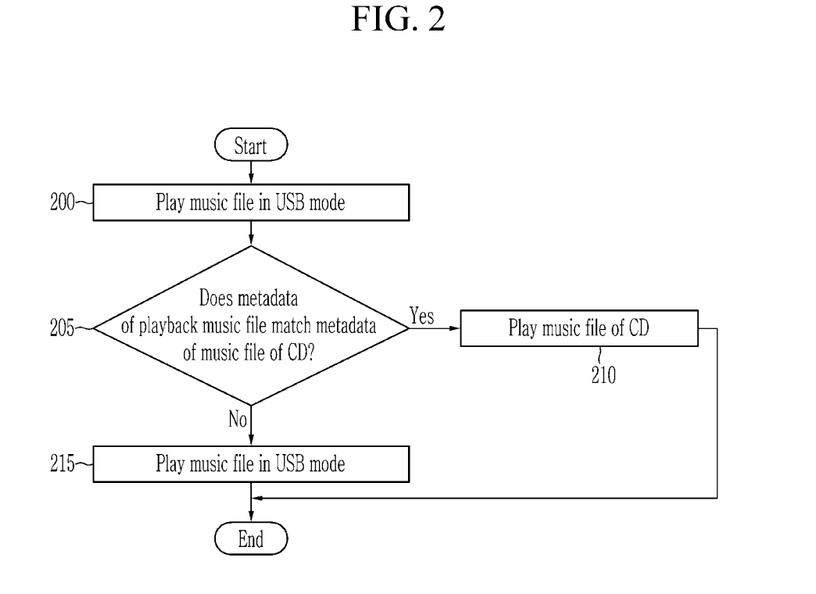
FIG. 2 is a flowchart illustrating a method for playing music in a vehicle audio system according to another embodiment of the present invention.
Figure 3:
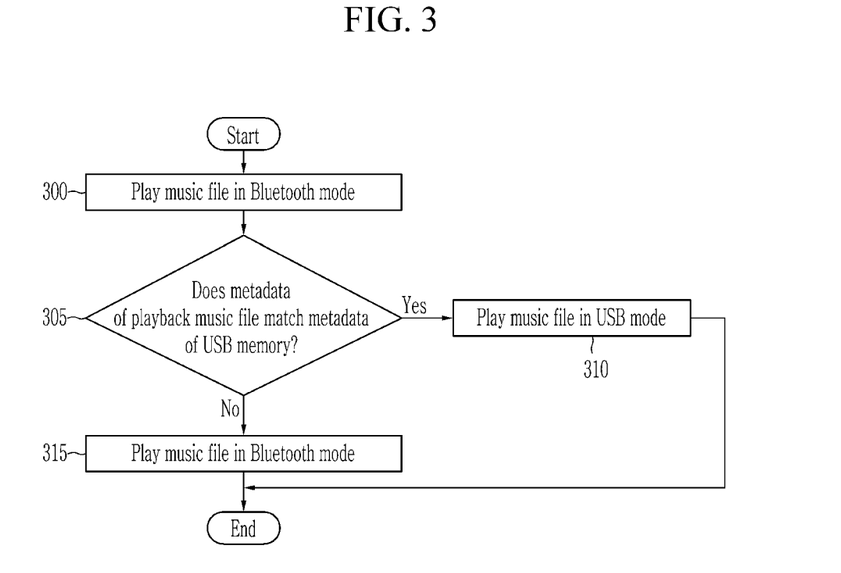
FIG. 3 is a flowchart illustrating a method for playing music in a vehicle audio system according to another embodiment of the present invention.
Figure 4:
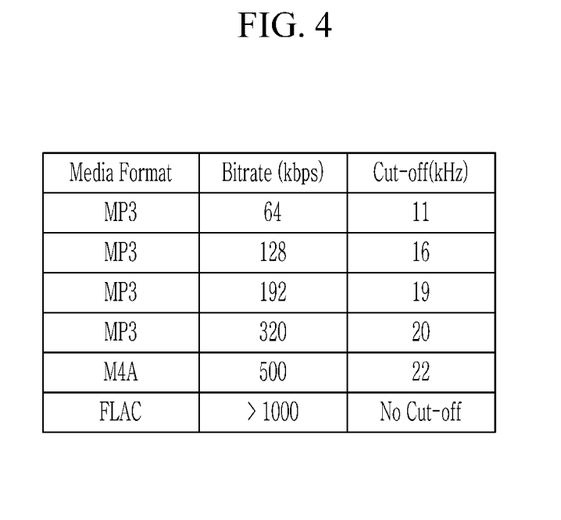
FIG. 4 is a table for explaining a relationship between a cut-off frequency of a music file, to which a method for playing music in a vehicle audio system according to an embodiment of the present invention is applied, and a bit rate of the music file.
Figure 5:
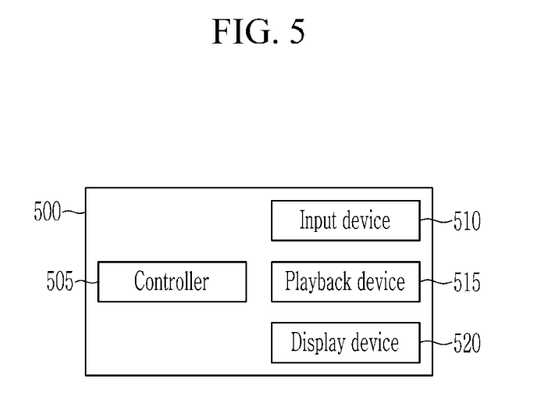
FIG. 5 is a block diagram illustrating a vehicle audio system to which the method for playing music according to the embodiment of the present invention is applied.

FIG. 1 is a flowchart illustrating a method for playing music in a vehicle audio system according to an embodiment of the present invention. FIG. 2 is a flowchart illustrating a method for playing music in a vehicle audio system according to another embodiment of the present invention. FIG. 3 is a flowchart illustrating a method for playing music in a vehicle audio system according to another embodiment of the present invention. FIG. 4 is a table for explaining a relationship between a cut-off frequency of a music file, to which a method for playing music in a vehicle audio system according to an embodiment of the present invention is applied, and a bit rate of the music file. FIG. 5 is a block diagram illustrating a vehicle audio system to which the method for playing music according to the embodiment of the present invention is applied.

Referring to FIG. 1, FIG. 4, and FIG. 5, in a playback step 100, a controller 505 may play a music file of a user device that is received via communication and is selected by a user of the vehicle audio system. For example, the communication may include near field wireless communication such as Bluetooth communication, and the user device may include a mobile terminal such as a smart phone with an application, a tablet personal computer, or a smart pad.

The controller 505, which is a central processing unit (CPU), may control an entire operation of the audio system for the vehicle. For example, the controller 505 may be one or more microprocessors operated by a program or hardware including the microprocessor. The program may include a series of commands for executing the method for playing music in the vehicle audio system according to the embodiment of the present invention. The commands may be stored in a memory of the vehicle audio system 500.

The vehicle audio system 500 may include a controller 505, an input device (or an input part) 510 that receives the user's command, a playback device (or a playback part) 515, a display device (e.g., a liquid crystal display (LCD)) 520. In another embodiment of the present invention, the playback device 515 may be included in the controller 505. For example, the vehicle audio system 500 may be an audio video navigation (AVN) device of the vehicle that plays multimedia data.

The controller 505 may control the vehicle audio system 500 in response to a signal input to the input device 510. The playback device 515 may include an audio processor that plays the music file selected by the user and performs volume adjustment according to the user's command. The display device 520 may display an operating mode (e.g., a Bluetooth mode) of the music file or the vehicle audio system 500.

According to a determination step 105, the controller 505 may determine whether metadata of the music file to be played matches metadata of a music file that is stored in a first storage device and has sound quality that is better than sound quality of the music file of the user device. For example, the first storage device may include a compact disc (CD) that is installed in or connected to the vehicle audio system 500. In another embodiments, the first storage device may include an optical disc drive with an optical disc which may include a compact disc, a DVD or another optical medium.

For example, the metadata may include attribute information of the music file related to a music title, a genre, an artist, and an album of the music file.

The controller 505 may detect the sound quality of the music file of the user device based on a cutoff frequency of the music file of the user device and may detect the sound quality of the music file of the first storage device based on a cutoff frequency of the music file of the first storage device.

The controller 505 may analyze the music file to detect the cutoff frequency of the music file. As shown in FIG. 4, the controller 505 may detect bitrate of the music file using the cutoff frequency. For example, a relationship between the cutoff frequency of the music file and the bitrate of the music file may be determined by a test. The controller 505 may detect the bitrate of the music file from the cutoff frequency using a known method (or a known program). When the bitrate is high, the sound quality may be good. For example, when the cutoff frequency of an MPEG audio layer 3 (MP3) file is 20 (kHz), the bitrate of the MP3 file may be 320 (kbps). An order in which sound quality of a music file is good may be a music file of a compact disc (CD), a music file of a universal serial bus (USB) memory device, and a music file transmitted via Bluetooth communication.

According to a playback step 110, when the metadata of the music file to be played coincides with or matches the metadata of the music file of the first storage device, the controller 505 may stop playback of the music file of the user device and may play the music file of the first storage device. When the music file of the first storage device is played, the controller 505 may control the display device 520 to display that the vehicle audio system 500 operates in the Bluetooth mode in order to prevent the user's confusion. In one embodiment, upon receipt of a user input for playing the music file from the user device, the controller may perform step 110 before playing the music file from the user's Bluetooth device, for example, a user's smartphone. When determined that the metadata of the music file from the user's Bluetooth device matches the metadata of the music file of the first storage device, the controller may cause the playback device to play the music file from the first storage device without playing the music file from the user's Bluetooth device.

According to a step 115, when the metadata of the music file to be played does not match the metadata of the music file of the first storage device, the controller 505 may determine whether the metadata of the music file to be played matches metadata of a music file that is stored in a second storage device and has sound quality that is better than the sound quality of the music file of the user device and lower than the sound quality of the music file of the first storage device. For example, the second storage device may include a universal serial bus (USB) memory device (or a USB memory stick) installed in (or connected to) the vehicle audio system 500.

The controller 505 may detect the sound quality of the music file of the first storage device using the cutoff frequency of the music file of the first storage device and may detect the sound quality of the music file of the second storage device using a cutoff frequency of the music file of the second storage device. The controller 505 may analyze the music file to detect the cutoff frequency of the music file. As shown in FIG. 4, the controller 505 may detect bitrate of the music file using the cutoff frequency. For example, a relationship between the cutoff frequency of the music file and the bitrate of the music file may be determined by a test. The controller 505 may detect the bitrate of the music file from the cutoff frequency using a known method (or a known program). When the bitrate is high, the sound quality may be good. The order in which sound quality of a music file is good may be a music file of a compact disc (CD), a music file of a universal serial bus (USB) memory device, and a music file transmitted via Bluetooth communication.

According to a step 120, when the metadata of the music file to be played matches the metadata of the music file of the second storage device, the controller 505 may play the music file of the second storage device corresponding to the music file of the user device. When the music file of the second storage device is played, the controller 505 may control the display device 520 to display that the vehicle audio system 500 operates in the Bluetooth mode in order to prevent the user's confusion.

According to a step 125, when the metadata of the music file to be played does not match the metadata of the music file of the second storage device, the controller 505 may continuously play the music file of the user device.

Referring to FIG. 2, FIG. 4, and FIG. 5, in a step 200, the controller 505 may play a music file of a first storage device that is selected by the user. For example, the first storage device may include a USB memory device installed in the vehicle audio system 500.

According to a step 205, the controller 505 may determine whether metadata of the music file to be played matches metadata of a music file that is stored in a second storage device and has sound quality that is better than sound quality of the music file of the first storage device. For example, the second storage device may include a compact disc (CD) installed in the vehicle audio system 500.

For example, the metadata may include attribute information of the music file related to a genre, an artist, and an album of the music file.

The controller 505 may detect the sound quality of the music file of the first storage device using a cutoff frequency of the music file of the first storage device and may detect the sound quality of the music file of the second storage device using a cutoff frequency of the music file of the second storage device. The controller 505 may analyze the music file to detect the cutoff frequency of the music file. As shown in FIG. 4, the controller 505 may detect bitrate of the music file using the cutoff frequency. For example, a relationship between the cutoff frequency of the music file and the bitrate of the music file may be determined by a test. The controller 505 may detect the bitrate of the music file from the cutoff frequency using a known method (or a known program). When the bitrate is high, the sound quality may be good. The order in which sound quality of a music file is good may be a music file of a compact disc (CD) and a music file of a universal serial bus (USB) memory device.

According to a step 210, when the metadata of the music file to be played matches the metadata of the music file of the second storage device, the controller 505 may play the music file of the second storage device corresponding to the music file of the first storage device. When the music file of the second storage device is played, the controller 505 may control the display device 520 to display that the vehicle audio system 500 operates in a USB mode in order to prevent the user's confusion.

According to a step 215, when the metadata of the music file to be played does not match the metadata of the music file of the second storage device, the controller 505 may continuously play the music file of the first storage device.

In embodiments, referring to FIGS. 3 to 5, in a step 300, the controller 505 may play a music file of a user device that is received via communication and is selected by the user. For example, the communication may include near field wireless communication such as Bluetooth communication, and the user device may include a mobile terminal such as a smart phone with an application, a tablet personal computer, or a smart pad.

According to a step 305, the controller 505 may determine whether metadata of the music file to be played matches metadata of a music file that is stored in a storage device and has sound quality that is better than sound quality of the music file of the user device. For example, the storage device may include a universal serial bus (USB) memory device installed in the vehicle audio system 500.

For example, the metadata may include attribute information of the music file related to a genre, an artist, and an album of the music file.

The controller 505 may detect the sound quality of the music file of the user device using a cutoff frequency of the music file of the user device and may detect the sound quality of the music file of the storage device using a cutoff frequency of the music file of the storage device. The controller 505 may analyze the music file to detect the cutoff frequency of the music file. As shown in FIG. 4, the controller 505 may detect bitrate of the music file using the cutoff frequency. For example, a relationship between the cutoff frequency of the music file and the bitrate of the music file may be determined by a test. The controller 505 may detect the bitrate of the music file from the cutoff frequency using a known method (or a known program). When the bitrate is high, the sound quality may be good. The order in which sound quality of a music file is good may be a music file of a universal serial bus (USB) memory device and a music file transmitted via Bluetooth communication.

According to a step 310, when the metadata of the music file to be played matches the metadata of the music file of the storage device, the controller 505 may play the music file of the storage device corresponding to the music file of the user device. When the music file of the storage device is played, the controller 505 may control the display device 520 to display that the vehicle audio system 500 operates in the Bluetooth mode in order to prevent the user's confusion.

According to a step 315, when the metadata of the music file to be played does not match the metadata of the storage device, the controller 505 may continuously play the music file of the user device.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The components, "~unit", block, or module which are used in the present embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some part thereof may be dispersedly distributed in a plurality of computers.

As set forth above, embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent embodiments are possible from the present invention. Accordingly, the actual technical protection scope of the present invention must be determined by the spirit of the appended claims.

DESCRIPTION OF SYMBOLS

505: controller
515: playback device
520: display device

What is claimed is:

1. A method of playing music in a vehicle audio system, comprising:
    receiving, by a controller, a user input for playing a music file of a user device that is received via communication between the user device and the vehicle audio system;
    determining, by the controller, whether metadata of the music file to be played matches metadata of a music file that is stored in a storage device connected to the vehicle audio system and has sound quality that is better than sound quality of the music file of the user device; and
    playing the music file of the storage device corresponding to the music file of the user device when determined that the metadata of the music file to be played matches the metadata of the music file of the storage device;
    determining, by the controller, whether the metadata of the music file to be played matches metadata of a music file that is stored in a secondary storage device connected to the vehicle audio system and has sound quality that is better than the sound quality of the music file of the user device when determined that the metadata of the music file to be played does not match the metadata of the music file of the storage device; and
    playing, by the controller, the music file of the secondary storage device corresponding to the music file of the user device when determined that the metadata of the music file to be played matches the metadata of the music file of the secondary storage device.

2. The method of claim 1, wherein the controller detects the sound quality of the music file of the user device based on a cutoff frequency of the music file of the user device and detects the sound quality of the music file of the storage device based on a cutoff frequency of the music file of the storage device.

3. The method of claim 1, wherein the storage device includes an optical disc drive containing an optical disc medium.

4. The method of claim 1, wherein the controller controls a display device to display that the vehicle audio system operates in a mode where the music file of the user device is played when the music file of the storage device is played.

5. The method of claim 1, wherein the storage device includes an optical disc drive containing an optical disc medium and the secondary storage device includes a universal serial bus memory device.

6. The method of claim 1, wherein the controller controls a display device to display that the vehicle audio system operates in a mode where the music file of the user device is played when the music file of the secondary storage device is played.

7. The method of claim 1, wherein the user device i-s-wirelessly communicates with the vehicle audio system.

8. The method of claim 1, further comprising: upon receipt of the user input, by the controller, playing the music file of the user device; and stopping, by the controller, playing the music file of the user device when determined that the metadata of the music file received from the user device matches the metadata of the music file of the storage device.

9. The method of claim 1, wherein the storage device includes a universal serial bus memory device.

10. A vehicle audio system comprising:
    a playback device configured to play a music file of a user device received through wired or wireless communication between the user device and the vehicle audio system; and
    a controller configured to control an operation of the playback device and to determine whether metadata of the music file to be played matches metadata of a music file that is stored in a first storage device connected to the vehicle audio system and has sound quality that is better than sound quality of the music file of the user device, wherein the controller is configured to control the playback device to play the music file of the first storage device when determined that the metadata of the music file to be played matches the metadata of the music file of the first storage device,
    wherein the controller is configured to determine whether the metadata of the music file to be played matches metadata of a music file that is stored in a second storage device and has sound quality that is better than the sound quality of the music file of the user device when determined the metadata of the music file to be played does not match the metadata of the music file of the first storage device, and the controller is configured to control the playback device to play the music file of the second storage device corresponding to the music file of the user device when determined that the metadata of the music file to be played matches the metadata of the music file of the second storage device.

11. The vehicle audio system of claim 10, wherein the controller is configured to detect the sound quality of the music file of the user device based on a cutoff frequency of the music file of the user device and is configured to detect the sound quality of the music file of the first storage device based on a cutoff frequency of the music file of the first storage device.

12. The vehicle audio system of claim 10, wherein the first storage device includes an optical disc drive configure to receive an optical disc medium.

13. The vehicle audio system of claim 10, wherein the second storage device includes a universal serial bus memory device.

* * * * *